G. Walker,
Grinding Saws.
Nº 22,834.   Patented Feb. 1, 1859.
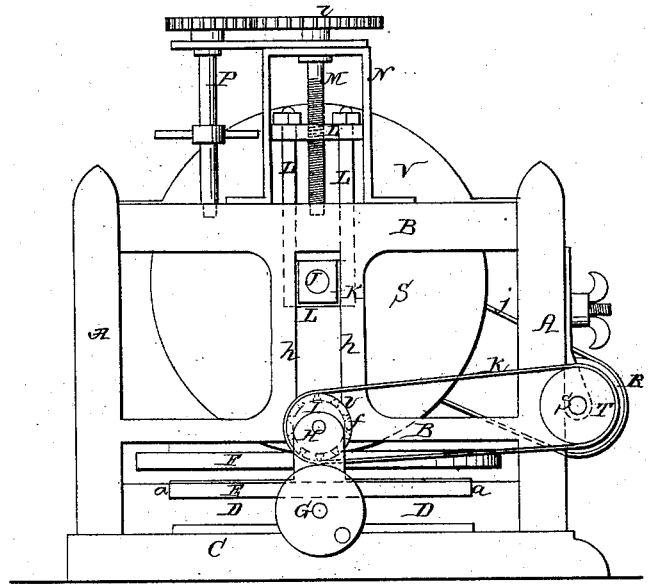
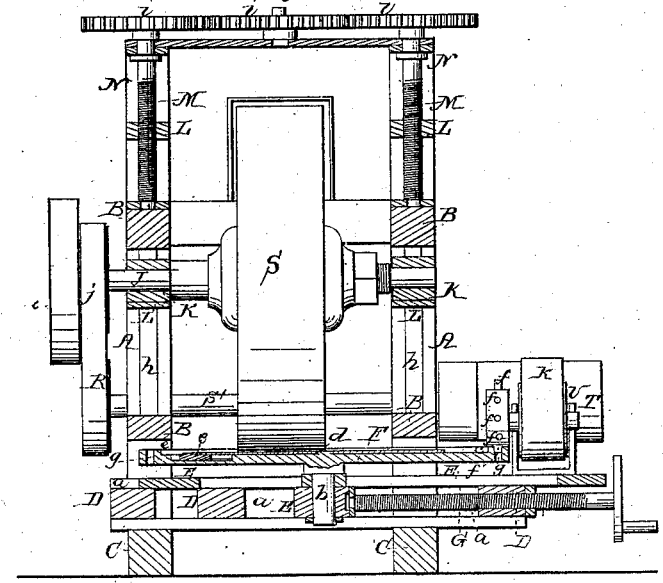
Witnesses:
Thomas Walters
Peter Willes
Inventor:
George Walker

UNITED STATES PATENT OFFICE.

GEORGE WALKER, OF PORT JERVIS, NEW YORK.

MACHINE FOR GRINDING SAWS.

Specification of Letters Patent No. 22,834, dated February 1, 1859.

*To all whom it may concern:*

Be it known that I, GEORGE WALKER, of Port Jervis, in the county of Orange and State of New York, have invented certain new and useful Improvements in Machinery for Grinding Saws; and I do hereby declare that the following is a full, clear, and exact description of the same, reference being had to the accompanying drawings, forming part of this specification, in which—

Figure 1 is a side view of a machine constructed according to my invention. Fig. 2 is a vertical section of the same, in a plane parallel with the axis of the grindstone.

Similar letters of reference indicate corresponding parts in both figures.

To enable others skilled in the art to make and use my invention, I will proceed to describe its construction and operation.

The drawing exhibits only the application of my invention to the grinding of circular saws, but the same machinery there represented can be made applicable by changing the rotating for a reciprocating saw bed, to the grinding of straight saws, as I will endeavor to make intelligible after describing the grinding of circular saws.

A, B, C is the stationary framing of the machine, supporting on its bottom sills C, a strong horizontal frame D, which contains horizontal ways $a$, $a$, to receive a sliding carriage E, which contains the bearing or bearings for the center shaft or axle $b$, of the horizontal rotating saw bed F, which is under the grindstone S. The frame D, with the carriage E, and saw bed F, can be removed from the machine at pleasure as the said frame D, simply rests on the sills C, of the main framing and fits between the uprights A, A, thereof in such a manner as to prevent its turning. To remove it, it is only necessary to slide it out endwise from between the posts A, A.

The carriage E, is made movable in the ways $a$, $a$, by a feed screw G, which may be operated by hand or a belt or gearing, the said ways $a$, $a$, being parallel with the axis of the stone, and the axis of the saw bed in the same vertical plane as the axis of the stone, which is horizontal.

The saw bed F is made of cast iron of circular form and with a flat-bottomed recess $c$, $c$, in its face to receive the saws, said recess serving to retain a small quantity of water for the purpose of keeping the stone wet at the point of grinding. The saw is confined to the bed F, by a small projection $d$, above the bottom of the recess $c$, $c$, entering its eye, and one or more sliding dogs $e$, entering the spaces between its teeth; said projection being of less height than the thickness of the saw plate.

The saw bed F is driven by gearing from a horizontal shaft H, such gearing being either of the kind represented in Fig. 2, consisting of a wheel I, on the shaft H, having pins $f$, $f$, projecting from its periphery to enter holes $g$, $g$, in the margin of the bed, or ordinary bevel gearing; the driving wheel I in either case resting on the top of the bed and serving to press it down, so that by keeping the center of the bed between the grindstone and said driving gear, the latter, by pressing on the bed on the opposite side of the center to where the stone presses, is caused to hold the saw up to the grindstone and prevent the pressure of the grindstone causing the shaft or axle $f$, to wear its bearing or bearings out of plumb.

The shaft J, of the grindstone S, is fitted to bearings in boxes K, K, which are suspended in frames L, L, from screws M, M, which are arranged to work in standards N, N, erected on the top of the framing A, B, C, but prevented moving longitudinally. The said frames L, L, work in vertical guides $h$, $h$, in the stationary framing, and the screws M M, are geared together and with a capstan shaft P, on each side of the machine by gearing $i$, $i$, $i$, in such a manner that both are turned simultaneously in the same direction by turning either capstan shaft, and the grindstone is raised or lowered with its shaft always in a horizontal position. V, is a hood to cover the top of the grindstone.

The power to drive the machine is applied to the shaft of the grindstone by a belt or gearing from any prime mover, and the said shaft carries a pulley Q, from which a belt $j$, runs to a pulley R, on a shaft S', working in bearings attached to the outside of the stationary framing. This shaft S, carries a pulley T, from which a belt $k$, runs to a pulley U, on the shaft H, of the gear I, which drives the rotating bed. The pulley T should be long enough to permit the belt to operate through the whole travel of the carriage E.

The operation of the grinding a circular saw in this machine is as follows:—The stone having been elevated sufficiently to permit it, the saw is placed upon the bed F, and secured by the dog e. The stone is then set in motion and the saw bed and saw derive a rotary motion from it. The stone is then lowered into contact with the saw, to produce the required pressure thereon, and the grinding is commenced. The commencement of the grinding should be either at the center or near the periphery of the saw; and by means of the feed screw, the carriage is moved to carry the whole of the saw from center to periphery and vice versa, back and forth under the grindstone, keeping the center of the saw bed always between the stone and the driving gear H. The stone is slightly lowered from time to time, as may be necessary during the grinding operation by means of the screws M, M.

To enable the machine to grind straight saws, the frame D, with the saw bed carriage E, and the saw bed F, should be taken out of the machine, and be replaced by another frame containing a straight carriage which should have a reciprocating motion imparted to it and have a feed screw applied in such a way as to permit every part of the saw to be presented under the stone.

What I claim as my invention and desire to secure by Letters Patent, is:

1. The arrangement and combination of the wheel I, and bed plate F, substantially as herein shown and described, whereby said driving wheel is made to drive the bedplate and also to compensate for the pressure of the grindstone, as set forth.

2. I claim the flat-bottomed water recess (c, c) in the face of the bedplate F, as shown.

GEORGE WALKER.

Witnesses:
A. H. STEWARDT,
THOMAS WALTERS.